Nov. 19, 1968
A. COMPOLY
3,412,313
SHORT CIRCUIT PROTECTIVE CIRCUIT
Filed Feb. 23, 1967
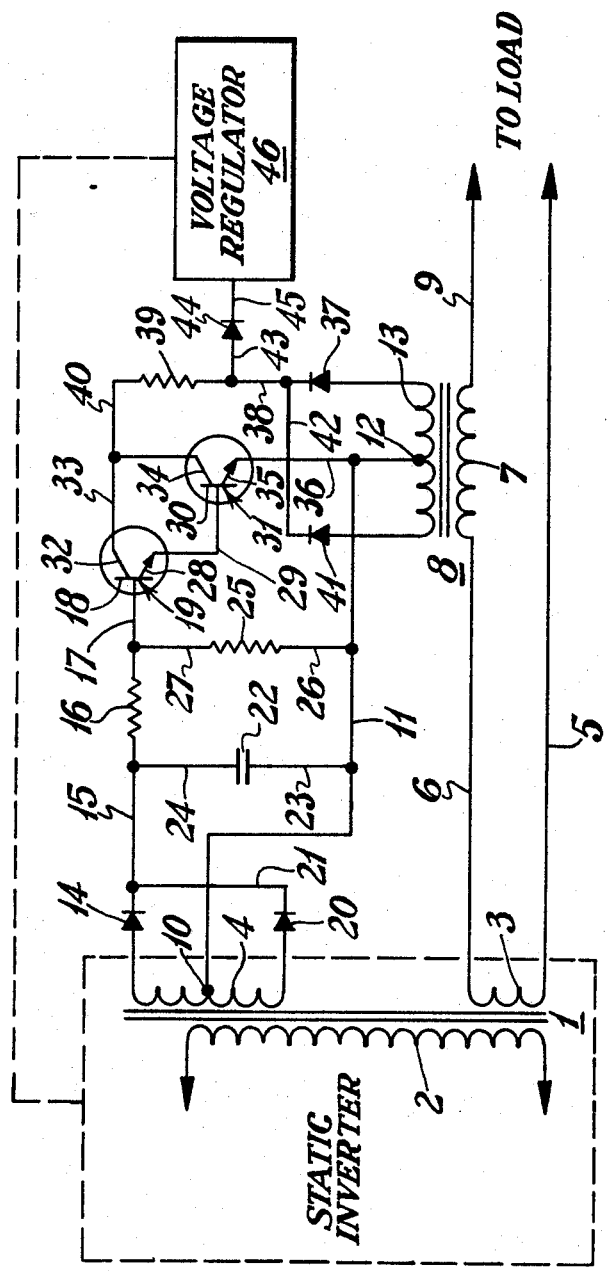
INVENTOR.
ALBERT COMPOLY
BY
ATTORNEY

United States Patent Office 3,412,313
Patented Nov. 19, 1968

3,412,313
SHORT CIRCUIT PROTECTIVE CIRCUIT
Albert Compoly, Marlboro, N.J., assignor to The Bendix Corporation, Eatontown, N.J., a corporation of Delaware
Filed Feb. 23, 1967, Ser. No. 618,186
6 Claims. (Cl. 321—14)

ABSTRACT OF THE DISCLOSURE

A circuit utilizing a time delay to allow a predetermined short circuit current to be delivered for a predetermined time and then reducing the current to a safe value.

Background of the invention

*Field of the invention.*—The invention relates to the field of protecting static inverters utilizing semiconductor devices from damage by high currents resulting from short circuits.

*Description of the prior art.*—Heretofore protection for such devices have been fuses or circuit breakers. Due to the time required for such protective device to actuate, the components in a static inverter could be damaged. The present invention limits the time duration of the short circuit current to a safe value and also lowers the current without shutting off the device so that upon removal of the short circuit normal operation will be resumed immediately.

Summary

The present invention relates to the protection of components of electrical devices from damage by high currents caused by short circuits. The short circuit currents are limited in time and also reduced to a safe level.

Brief description of the drawing

The single figure is a schematic diagram of a circuit embodying the invention.

Description of the preferred embodiment

Referring now to the drawing a transformer 1 which is the output transformer from a static inverter, the remainder of which is not shown for simplicity. The transformer has a primary winding 2 and secondary windings 3 and 4. The winding 3 has one side connected by conductor 5 to one side of a suitable load. The other side of the winding 3 is connected by conductor 6 to one side of primary winding 7 of a current transformer 8. The other side of the winding 7 is connected by conductor 9 to the other side of the load.

The winding 4 has a center tap 10 connected by conductor 11 to a center tap 12 on secondary winding 13 of the current transformer 8. One side of the winding 4 is connected by diode 14, conductor 15, resistor 16 and conductor 17 to base 18 of a transistor 19. The other side of the winding 4 is connected by diode 20 and conductor 21 to the conductor 15. A capacitor 22 is connected by conductors 23 and 24 between the conductor 11 and 16 and a resistor 25 is connected by conductors 26 and 27 between the conductors 11 and 17.

The transistor 19 has an emitter 28 connected by conductor 29 to base 30 of a transistor 31. The transistor 19 also has a collector 32 connected by conductor 33 to collector 34 of the transistor 31. The transistor 31 has an emitter 35 connected by conductor 36 to the center tap 12 of the winding 13.

The winding 13 has one side connected by diode 37, conductor 38, resistor 39 and conductor 40 to the conductor 33. The other side of the winding 13 is connected by diode 41 and conductor 42 to the conductor 38. The conductor 38 is also connected by conductor 43, diode 44 and conductor 45 to voltage regulator 46 which is tied in with the static inverter as indicated by the dashed line 47.

In operation, the transformer 8 senses the load current and may be the normal current sensing transformer utilized in static inverters. The rectifiers 37 and 41 rectify the output from the winding 13 of the transformer 8. The resistor 39 is the loading resistor for the transformer 8, and sets the short circuit level. Changing the value of the resistor 39 changes the level of short circuit current. The transistor 31 is utilized as a switch to change the loading of the secondary winding 13 of the transformer 8. With the transistor 31 biased in the conducting state, the resistor 39 is the only load on the transformer 8. The transistor 31 is biased on from the winding 4 on the power output transformer 1. The diodes 14 and 20 rectify the AC output voltage. The capacitor 22 is charged up with this rectified voltage smoothing out the ripple and furnishes a source of DC bias. The resistors 16 and 25 form a voltage divider network to provide the proper level of bias for the transistor 19 and also are selected to provide the proper time delay during short circuit operation. The transistor 19 is an amplifier for the bias for the transistor 31.

During normal operation of the static inverter, an output voltage is always present to supply bias for the transistor 31. Upon a short-circuit condition arising, the output voltage falls to zero, however, the bias voltage for the transistor 19 does not fall immediately as the charge on the capacitor 22 requires a certain amount of time to discharge. The resistors 16 and 25 form a time delay network with the capacitor 22. The time constant of the circuit is set by the values selected for the resistors 16, 25, transistors 19 and 31 and the capacitor 22. The aforenoted components are selected to give a predetermined time delay, for example 5 seconds. After the predetermined time delay of high short current operation, the bias voltage falls below the threshold level of the transistor 31 causing it to go into a non-conducting high resistance state. Upon the transistor 31 being biased "off," the resistor 39 is effectively removed from loading the output of the transformer 8 and the output voltage will rise. This increased voltage will produce a signal in the voltage regulator circuit to reduce the short circuit. The current will fall until the output voltage from the transformer 8 is reduced to its former quiescent level. A steady state signal is now maintained for the regulator but from a substantially reduced output current level. The sustained short circuit current can be reduced to less than 20% of the normal operating load current. Upon the removal of the short-circuit across the load the output voltage of the static inverter will immediately rise to its regulated value. Bias voltage will again be supplied to the transistor 31 and the entire circuit will reset automatically for normal operation. The diode 44 provides isolation from the regulator circuit and prevent circuit interaction.

Although only one embodiment of the invention has been illustrated and described, various changes in the form and relative arrangement of the parts, which will appear to those skilled in the art, may be made without departing from the scope of the invention.

What is claimed is:

1. A short circuit protective circuit for a static inverter comprising a voltage regulator connected for controlling the excitation of said static inverter, means for sensing the output current of said inverter, a predetermined load connected to said current sensing means, and other means connected to the output of said static inverter responsive to the voltage of said output falling below a predetermined value to remove the load from said current sensing means to provide signal to said voltage regulator to reduce the output current to a safe value.

2. The combination as set forth in claim 1 and including a time delay for removing the load from said current sensing means.

3. The combination as set forth in claim 2 in which said time delay is a RC network.

4. The combination as set forth in claim 1 in which said current sensing means is a current transformer.

5. The combination as set forth in claim 1 in which a transistor is normally biased in a conducting state to maintain the load on said current sensing means.

6. The combination as set forth in claim 5 in which a resistor is switched out of the circuit upon the bias being removed from said transistor.

References Cited
UNITED STATES PATENTS

| 3,319,149 | 5/1967 | Start | 321—14 |
| 3,355,653 | 11/1967 | Paradissis | 321—19 X |
| 3,377,540 | 4/1968 | Meyer | 321—11 |

LEE T. HIX, *Primary Examiner.*

W. H. BEHA, Jr., *Assistant Examiner.*